US012580395B2

(12) United States Patent
  Isaji et al.

(10) Patent No.:  US 12,580,395 B2
(45) Date of Patent:      Mar. 17, 2026

(54) CIRCUIT STRUCTURE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yusuke Isaji, Osaka (JP); Manami Okada, Osaka (JP); Yuki Fujimura, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 637 days.

(21) Appl. No.: 18/040,656

(22) PCT Filed: Aug. 2, 2021

(86) PCT No.: PCT/JP2021/028537
  § 371 (c)(1),
  (2) Date: Feb. 6, 2023

(87) PCT Pub. No.: WO2022/030422
  PCT Pub. Date: Feb. 10, 2022

(65) Prior Publication Data
  US 2023/0283088 A1      Sep. 7, 2023

(30) Foreign Application Priority Data
  Aug. 6, 2020      (JP) ................................. 2020-133881

(51) Int. Cl.
  H01M 10/46      (2006.01)
  B60L 3/04      (2006.01)
  (Continued)

(52) U.S. Cl.
  CPC .............. H02J 7/0029 (2013.01); B60L 3/04 (2013.01); H02J 7/00 (2013.01); H02J 7/0031 (2013.01); H02J 7/0063 (2013.01); B60L 50/60 (2019.02)

(58) Field of Classification Search
  CPC .......... H02J 7/0029; H02J 7/0063; H02J 7/00; H02J 7/0031; H02J 1/00; B60L 50/60;
  (Continued)

(56) References Cited

U.S. PATENT DOCUMENTS 9,787,179 B1 * 10/2017 Clarkin ..................... G05F 1/40
2015/0061376 A1 * 3/2015 Hartl ......................... B60L 3/04
                                                                             307/116
(Continued)

FOREIGN PATENT DOCUMENTS

CN          107571739 A        1/2018
JP          2002-042626 A      2/2002
                  (Continued)

OTHER PUBLICATIONS

International Search Report, Application No. PCT/JP2021/028537, mailed Oct. 5, 2021. ISA/Japan Patent Office.

*Primary Examiner* — Laura K Tso
(74) *Attorney, Agent, or Firm* — Honigman LLP

(57)      ABSTRACT

A circuit structure with a novel structure is disclosed in which a measure against arcs can be implemented with a simple structure and a reduction in size and cost can be realized. A circuit structure including: a power supply line configured to connect a battery and a load; a main relay connected to the power supply line; a pre-charge circuit including a pre-charge resistor and a pre-charge relay connected in series, and connected in parallel to the main relay; and a sub relay connected in parallel to the pre-charge resistor.

4 Claims, 1 Drawing Sheet

(51) Int. Cl.
   *H02J 7/00*          (2006.01)
   *B60L 50/60*        (2019.01)

(58) Field of Classification Search
   CPC .. B60L 3/04; Y02T 10/70; H02H 9/02; H02H
                                                   1/00
   USPC ................................................. 320/127, 135
   See application file for complete search history.

(56)                       References Cited

U.S. PATENT DOCUMENTS

| | | |
|---|---|---|
| 2018/0029490 A1 | 2/2018 | Fritz et al. |
| 2023/0411093 A1* | 12/2023 | Katakami ............ H01H 47/002 |

FOREIGN PATENT DOCUMENTS

| | | |
|---|---|---|
| JP | 2010-213500 A | 9/2010 |
| JP | 2020-096480 A | 6/2020 |

* cited by examiner

CIRCUIT STRUCTURE

CROSS-REFERENCE TO RELATED APPLICATIONS

This application is the U.S. national stage of PCT/JP2021/028537 filed on Aug. 2, 2021, which claims priority of Japanese Patent Application No. JP 2020-133881 filed on Aug. 6, 2020, the contents of which are incorporated herein.

TECHNICAL FIELD

The present disclosure relates to a circuit structure.

BACKGROUND

Conventionally, a circuit structure including a relay is mounted in a vehicle such as an electric car or hybrid car in which a battery formed by high-voltage secondary cells is mounted. For example, JP 2010-213500A discloses a circuit structure including a relay for allowing and interrupting the supply of power from a battery to a motor or a generator connected thereto as a vehicle-side load via an inverter. Relays used in such a circuit structure are respectively provided on the positive electrode side and the negative electrode side, and the supply of power from the battery can be stopped by turning off both relays.

A comparatively large current flows through this type of circuit structure, and thus there is concern that an arc will occur when the contacts of the relays are turned on and off. Thus, relays with a unique structure serving to eliminate arcs are used. For example, JP 2002-42626A discloses a detailed structure of an electromagnetic contactor constituting a relay of a circuit structure. Specifically, the electromagnetic contactor includes a contact mechanism forming an electrical circuit, an electromagnet apparatus for driving the contact mechanism to open and close, and a casing for hermetically housing the contact mechanism and the electromagnet apparatus. Partition walls are provided on both sides in the electrical circuit direction of the contact mechanism of the electromagnet apparatus, and ventilation passages are formed between the partition walls and the casing. Furthermore, a permanent magnet that forms a magnetic field for biasing toward the ventilation passages is provided to eliminate arcs that occur when contacts are turned on and off.

In a conventionally structured circuit structure, as a measure against arcs, a uniquely structured electromagnetic contactor such as that described in JP 2002-42626A needs to be employed as a relay. Employing such a uniquely structured electromagnetic contactor has the latent issue of requiring a large arc space for obtaining the required arc voltage for shutting off a direct current, which leads to an increase in the size of the sealing container. Also, in order to reliably eliminate an arc, a large electromagnet is required, which inevitably increases the size of the electromagnetic contactor and cost.

Thus, a circuit structure with a novel structure is disclosed in which a measure against arcs can be implemented with a simple structure and a reduction in size and cost can be realized.

SUMMARY

A circuit structure of the present disclosure including: a power supply line configured to connect a battery and a load; a main relay connected to the power supply line; a pre-charge circuit including at least one pre-charge resistor and a pre-charge relay connected in series, and connected in parallel to the main relay; a sub relay connected in parallel to all of the at least one pre-charge resistor; and a control unit to which the main relay, the pre-charge relay, and the sub relay are connected, wherein, when turning off the main relay from a normal state where the main relay is on and the pre-charge relay and the sub relay are off, based on a control signal from the control unit, the pre-charge relay and the sub relay are turned on first and then the main relay is turned off.

Advantageous Effects of Disclosure

With the present disclosure, a measure against arcs can be implemented with a simple structure and a reduction in size and cost can be realized.

DETAILED DESCRIPTION OF PREFERRED EMBODIMENTS

Figure 1:
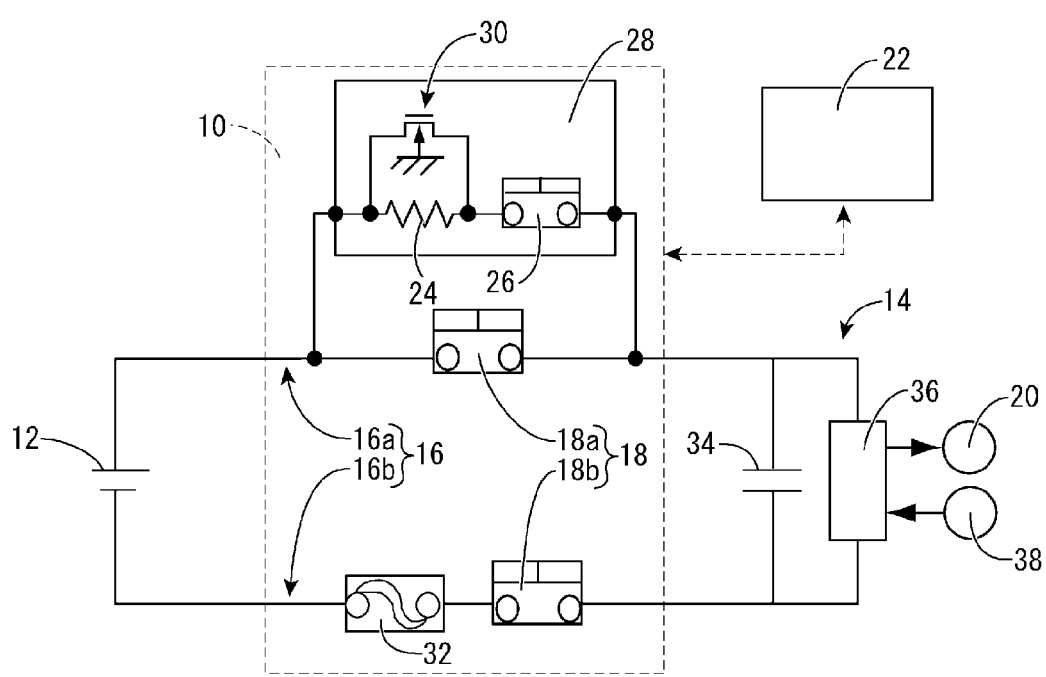
FIG. 1 is a diagram schematically showing an electrical configuration of a circuit structure according to Embodiment 1 of the present disclosure on a path between a battery and a load.

First, embodiments of the present disclosure will be listed and described below.

A circuit structure of the present disclosure includes: a power supply line configured to connect a battery and a load; a main relay connected to the power supply line; a pre-charge circuit including at least one pre-charge resistor and a pre-charge relay connected in series, and connected in parallel to the main relay; a sub relay connected in parallel to all of the at least one pre-charge resistor; and a control unit to which the main relay, the pre-charge relay, and the sub relay are connected, wherein, when turning off the main relay from a normal state where the main relay is on and the pre-charge relay and the sub relay are off, based on a control signal from the control unit, the pre-charge relay and the sub relay are turned on first and then the main relay is turned off.

With the circuit structure of the present disclosure, in contrast to a pre-charge resistor of a pre-charge circuit conventionally used in a circuit structure that connects a battery and a motor to each other, a simple structure in which a sub relay is connected in parallel enables the suppression of arcs that occur when the main relay is turned on and off.

Specifically, when shutting off the main relay, by turning on the pre-charge relay and the sub relay before turning off the main relay, it is possible to suppress or prevent a potential difference from occurring between contacts of the main relay when the main relay is turned off. Specifically, the sub relay is connected in parallel to the pre-charge resistor, and thus a current flows from the sub relay to the pre-charge relay, and as a result, it is possible to make the potential difference between contacts of the main relay zero when the main relay is turned off. Accordingly, it is possible to suppress or prevent the occurrence of an arc when the main relay is shut off. As a result, there is no need to employ a uniquely structured electromagnet contactor as the main relay, and by using a simple structure in which a sub relay is connected in parallel to a pre-charge resistor of a pre-existing pre-charge circuit, it is possible to provide a compact and low-cost circuit structure in which no arcs occur. Furthermore, the occurrence of an arc can be suppressed or prevented, and thus the operation reliability of the main relay can also be improved.

Note that the pre-charge circuit connected in parallel to the main relay and the sub relay connected in parallel to the pre-charge resistor of the pre-charge circuit may be provided on the positive electrode power supply line or the negative electrode power supply line. Also, the structure of the sub relay is not particularly limited, and any suitably structured relay can be used.

It is preferable that there are a plurality of the power supply lines, including a positive electrode power supply line and a negative electrode power supply line, and the pre-charge circuit and the sub relay are provided on the positive electrode power supply line. This is because, even if an existing pre-charge circuit is provided on the negative electrode power supply line, the existing pre-charge circuit provided on the positive electrode power supply line can be used to advantageously construct the circuit structure of the present disclosure.

It is preferable that the sub relay is constituted by a semi-conductor relay. This is because, the sub relay can be connected in parallel to the pre-charge resistor with less space required in the pre-charge circuit.

Specific examples of a circuit structure according to the present disclosure will be described below with reference to the drawings. Note that the present disclosure is not limited to these illustrative examples, but is indicated by the claims, and all changes that come within the meaning and range of equivalency of the claims are intended to be embraced therein.

Embodiment 1

A circuit structure 10 according to Embodiment 1 of the present disclosure is described below with reference to FIG. 1. The circuit structure 10 is mounted in a vehicle such as an electric car or hybrid car (not shown), for example. As shown in FIG. 1, the circuit structure 10 is configured to connect a battery 12 and a load 14 to each other, and includes a power supply line 16 that connects the battery 12 and the load 14 to each other. The battery 12, which is for travel by the vehicle, supplies power to a motor 20 that constitutes the load 14 and causes the vehicle to travel, via a main relay 18 that is connected to the power supply line 16 of the circuit structure 10 and turns the power supply line 16 on and off. Here, the main relay 18 performs on/off control based on a control signal from a control unit 22 that includes an ECU and the like. The main relay 18 connects the battery 12 and the motor 20 and supplies power to the motor 20 when on, and shuts off a current between the battery 12 and the motor 20 to stop the supply of power to the motor 20 when off. Note that there may be cases where only some members among a plurality of identical members are given reference numerals while reference numerals are omitted for the other members.

Circuit Structure 10

As shown in FIG. 1, the power supply line 16 of the circuit structure 10 includes a positive electrode power supply line 16a and a negative electrode power supply line 16b. The positive electrode of the battery 12 is connected to the input side of the positive electrode power supply line 16a, and the negative electrode of the battery 12 is connected to the input side of the negative electrode power supply line 16b. The positive electrode of the load 14 is connected to the output side of the positive electrode power supply line 16a, and the negative electrode of the load 14 is connected to the output side of the negative electrode power supply line 16b. A positive electrode main relay 18a and a negative electrode main relay 18b that connect the battery 12 and the load 14 are respectively connected to the positive electrode power supply line 16a and the negative electrode power supply line 16b between the input and output sides thereof.

A pre-charge circuit 28, in which a pre-charge resistor 24 and a pre-charge relay 26 are connected in series, is connected in parallel to the positive electrode main relay 18a connected to the positive electrodes of the battery 12 and the load 14 so as to bypass the positive electrode main relay 18a. As shown in FIG. 1, in Embodiment 1 of the present disclosure, the pre-charge resistor 24 is connected to the input side of the pre-charge relay 26. Also, the pre-charge resistor 24 is connected in parallel to a sub relay 30. In other words, the positive electrode power supply line 16a is provided with the pre-charge circuit 28 and the sub relay 30.

A fuse 32 is connected in series to the input side of the negative electrode main relay 18b that connects the negative electrodes of the battery 12 and the load 14. Note that, in Embodiment 1 of the present disclosure, the negative electrode main relay 18b connecting the negative electrodes of the battery 12 and the load 14 is not connected to the pre-charge circuit 28, but the pre-charge circuit 28 may also be connected similarly in parallel to the negative electrode main relay 18b as necessary. The positive electrode main relay 18a, the negative electrode main relay 18b, and the pre-charge relay 26 are all relays that switch a contact on/off by moving the contact while an exciting coil is in a conductive state, based on a control signal from the control unit 22.

Sub Relay 30

As shown in FIG. 1, the circuit structure 10 of Embodiment 1 of the present disclosure includes the sub relay 30. The sub relay 30 is configured using a MOSFET (Metal-Oxide-Semiconductor Field-Effect Transistor) structure, which is a semi-conductor relay. In addition to a Si-MOSFET most commonly used as the MOSFET, a SiC-MOSFET, a GaAs-FET, a GaN-FET, and the like can be used. Also, instead of a MOSFET, an IGBT (Insulated Gate Bipolar Transistor) or a bipolar transistor can also be used as a semiconductor relay.

Battery 12

The battery 12 is formed by chargeable secondary cells connected in series, and has a high output voltage of 100 to 400 V, for example. The current capacity can also be increased by connecting secondary cells in parallel. For the secondary cells, lithium ion secondary cells, lithium polymer secondary cells, nickel hydrogen cells, and the like can be used. Also, in place of or in addition to the secondary cells, a capacitor such as an electric double layer capacitor (EDLC) can also be used. In the present specification, secondary cells also include capacitors.

Load 14

The load 14 includes a large-capacity capacitor 34 and a DC/AC inverter 36 that are connected in parallel, for example. When the positive electrode main relay 18a is switched on while the capacitor 34 is fully discharged, an extremely large charging current instantaneously flows to charge the capacitor 34. The extremely large charging current damages the contact of the positive electrode main relay 18a, and thus the pre-charge circuit 28 is provided to prevent damage caused by the charging current. In Embodiment 1 of the present disclosure, the pre-charge circuit 28 is provided connected in parallel to the positive electrode main relay 18a. The pre-charge circuit 28 connects the pre-charge relay 26 and the pre-charge resistor 24 in series in order to limit the charging current of the capacitor 34. In a state where the pre-charge relay 26 has been switched on, the pre-charge resistor 24 limits the charging current of the capacitor 34 to a small current. At this time, the sub relay 30 is off. Note that, in Embodiment 1, the pre-charge resistor 24 is provided on the input side of the pre-charge relay 26, but the pre-charge resistor 24 may be provided on the output side of the pre-charge relay 26.

The load 14 connects the battery 12 to the motor 20 and a generator 38 via the DC/AC inverter 36. The DC/AC inverter 36 converts direct current from the battery 12 to alternating current, and supplies the resultant current to the motor 20, and converts alternating current from the generator 38 to direct current, and charges the battery 12 with the resultant current. Note that, while the motor 20 is performing regenerative braking, the motor 20 serves as a generator that charges the battery 12. In Embodiment 1 of the present disclosure, the DC/AC inverter 36 is used, but a DC/DC converter may be used.

Next, operation of the circuit structure 10 of Embodiment 1 of the present disclosure will be briefly described. First, all of the relays (main relay 18, pre-charge relay 26, and sub relay 30) are turned off. Next, after the negative main relay 18b has been turned on, the pre-charge relay 26 is turned on to pre-charge the capacitor 34 constituting the load 14. Once pre-charging of the capacitor 34 is complete, the pre-charge relay 26 is turned off, and then the positive electrode main relay 18a is turned on. In this case, the capacitor 34 is pre-charged in advance, and thus the instantaneous release of an extremely large charging current for charging the capacitor 34 is prevented. Thus, it is possible to prevent damage to the contact of the positive electrode main relay 18a caused by the charging current for the capacitor 34 while being able to supply power to the motor 20 with the battery 12 and the motor 20 connected to each other. Note that, in the following description, a state where the positive electrode main relay 18a and the negative electrode main relay 18b are on and the pre-charge relay 26 and the sub relay 30 are off is referred to as a normal state where appropriate.

When turning off the positive main relay 18a in the normal state, first, the pre-charge relay 26 and the sub relay 30 are turned on. Thus, a current flows from the sub relay 30 connected in parallel to the pre-charge resistor 24 to the pre-charge relay 26. Next, the positive electrode main relay 18a is turned off. The current flowing through the positive electrode main relay 18a flows from the sub relay 30 to the pre-charge relay 26. Accordingly, no current flows through the positive electrode main relay 18a and no potential difference occurs between the input and output of the positive electrode main relay 18a. Thus, when turning off the positive electrode main relay 18a, it is possible to suppress or prevent the occurrence of an arc across the input and output of the positive electrode main relay 18a. Note that, in this state, the current value is dependent on resistance, and thus hardly any current flows through the pre-charge resistor 24.

Next, the sub relay 30 is turned off. Accordingly, the current flowing through the positive electrode power supply line 16a passes through the pre-charge resistor 24, and thus the current flowing through the pre-charge relay 26 is largely limited. Thus, after the sub relay 30 is turned off, even if the pre-charge relay 26 is turned off, the occurrence of an arc can be advantageously suppressed. Lastly, the negative electrode main relay 18b is turned off. At this time, the positive electrode main relay 18a and the pre-charge relay 26 are already off, and thus no current flows to the negative electrode main relay 18b, and no arc will occur when the negative electrode main relay 18b is turned off. In doing so, the operation of turning off the circuit structure 10 of Embodiment 1 is complete.

With the circuit structure 10 of Embodiment 1 of the present disclosure, there is no need to employ a uniquely structured electromagnetic contactor as the main relay 18 as is conventional. Specifically, by simply connecting the sub relay 30 in parallel to the pre-charge circuit 24 of a pre-existing pre-charge circuit provided on the positive electrode power supply line 16a, it is possible to provide a compact and low-cost circuit structure 10 in which no arcs occur. Furthermore, the occurrence of an arc can be suppressed or prevented, and thus the operation reliability of the main relay 18 can also be improved.

The sub relay 30 can be reduced in size compared to the main relay 18 and the pre-charge relay 26, which are other relays that switch a contact on and off by moving the contact while an exciting coil is in a conductive state, and thus a reduction in space occupied by the circuit structure 10 can be advantageously realized.

Embodiment 2

Figure 2:
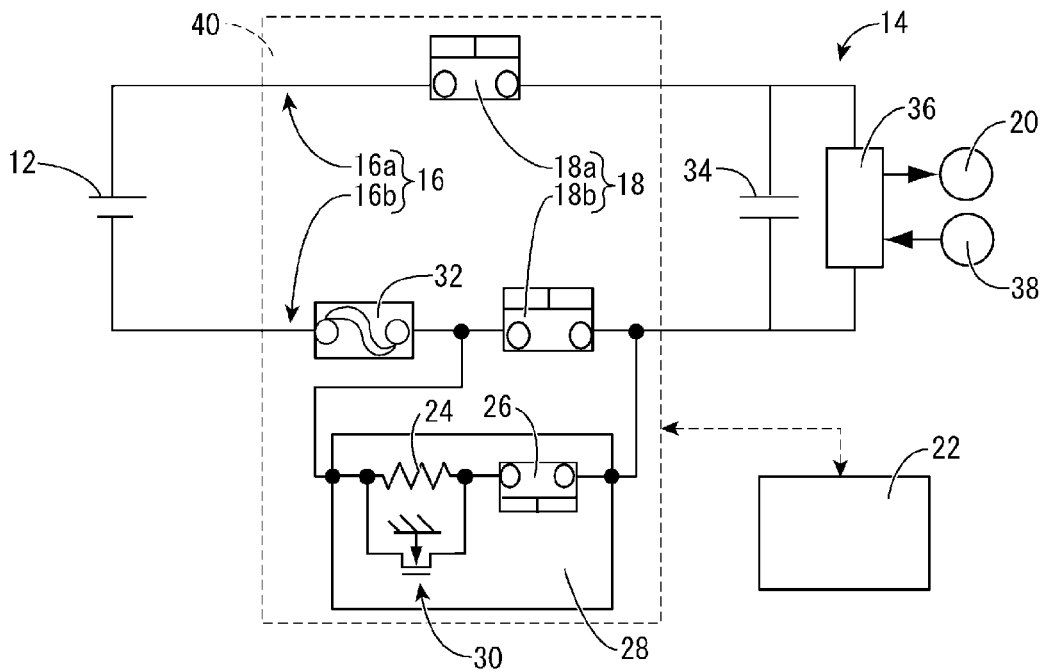
FIG. 2 is a diagram schematically showing an electrical configuration of a circuit structure according to Embodiment 2 of the present disclosure on a path between a battery and a load.

In the circuit structure 10 of Embodiment 1, the pre-charge circuit 28 and the sub relay 30 are provided in parallel to the positive electrode main relay 18a provided on the positive electrode power supply line 16a, but the present disclosure is not limited to this. As with a circuit structure 40 according to Embodiment 2 of the present disclosure and shown in FIG. 2, the pre-charge circuit 28 and the sub relay 30 may be provided in parallel to the negative electrode main relay 18b provided on the negative electrode power supply line 16b and not the positive electrode power supply line 16a. In this case as well, the state where the positive electrode main relay 18a and the negative electrode main relay 18b are on and the pre-charge relay 26 and the sub relay 30 are off is referred to as a normal state. Then, before turning off the negative electrode main relay 18b from the normal state, the pre-charge relay 26 and the sub relay 30 are turned on. Thus, a current flows from the pre-charge relay 26 to the sub relay 30 connected in parallel to the pre-charge resistor 24. In this state, even if the negative electrode main relay 18b is turned off, the current flowing through the negative electrode main relay 18b flows to the pre-charge relay 26 and the sub relay 30. Accordingly, no current flows through the negative electrode main relay 18b, and no potential difference occurs between the input and output of the negative electrode main relay 18b. Thus, when turning off the negative electrode main relay 18b, it is possible to suppress or prevent an arc from occurring between the input and output of the negative electrode main relay 18b.

Then, turning off the sub relay 30 results in the current that flows through the negative electrode power supply line 16b passing through the pre-charge resistor 24, and thus the current passing through the pre-charge relay 26 is largely limited. Accordingly, after the sub relay 30 is turned off, it is possible to advantageously suppress an arc even if the pre-charge relay 26 is turned off. Lastly, the positive electrode main relay 18a is turned off. The negative electrode main relay 18b and the pre-charge relay 26 are already turned off at this time, and thus no arc will occur when the positive electrode main relay 18a is turned off. In this manner, the operation of turning off the circuit structure 40 of Embodiment 2 can be completed. Thus, it is clear that Embodiment 2 of the present disclosure has similar effects to those of Embodiment 1 of the present disclosure.

Variations

Embodiment 1 and Embodiment 2 were described in detail as specific examples of the present disclosure, but the present disclosure is not limited to the specific matters thus described. Variations, improvements, and the like within the scope of achieving the object of the present disclosure are to be included in the present disclosure. Variations such as the following are also included in the technical scope of the present disclosure, for example.

In Embodiment 1 and Embodiment 2, an example was described where a semiconductor relay is used as the sub relay 30. Instead of a semiconductor relay, a suitably configured relay such as a relay that switches a contact on/off by moving the contact while an exciting coil is in a conductive state can be used as the sub relay 30.

In Embodiment 1 and Embodiment 2, the circuit structures 10 and 40 are directly connected to the battery 12, but the circuit structures 10 and 40 of the present disclosure can also be disposed on a part that is connected to the battery 12 via another member or another circuit portion.

In Embodiment 1 and Embodiment 2, a case where, when turning off the circuit structures 10 and 40, the pre-charge relay 26 is turned off after the sub relay 30 is turned off was described as an example, but the present disclosure is not limited to this. A control signal for turning off the sub relay 30 and the pre-charge relay 26 may be sent to the two relays at the same time. In this case as well, the sub relay 30 is faster to respond than the pre-charge relay 26, and thus the pre-charge relay 26 is turned off after the sub relay 30 is turned off. Thus, a circuit for transmitting the control signal can be simplified.

In Embodiment 1 and Embodiment 2, the pre-charge resistor 24 is disposed on the battery 12 side of the pre-charge relay 26, but the present disclosure is not limited to this. Embodiment 1 and Embodiment 2 may be modified such that the pre-charge resistor 24 is disposed on the load 14 side of the pre-charge relay 26. Also, pre-charge resistors 24 may be respectively provided on the battery 12 side and the load 14 side of the pre-charge relay 26. In either case, equalizing the total resistance values of the pre-charge resistors 24 exhibits the same results.

The invention claimed is:

1. A circuit structure comprising:
   a power supply line configured to connect a battery and a load;
   a main relay connected to the power supply line;
   a pre-charge circuit including at least one pre-charge resistor and a pre-charge relay connected in series, and connected in parallel to the main relay;
   a sub relay connected in parallel to all of the at least one pre-charge resistor; and
   a control unit to which the main relay, the pre-charge relay, and the sub relay are connected,
   wherein, when turning off the main relay from a normal state where the main relay is on and the pre-charge relay and the sub relay are off, based on a control signal from the control unit, the pre-charge relay and the sub relay are turned on first and then the main relay is turned off.

2. The circuit structure according to claim 1, wherein there are a plurality of the power supply lines, including a positive electrode power supply line and a negative electrode power supply line, and the pre-charge circuit and the sub relay are provided on the positive electrode power supply line.

3. The circuit structure according to claim 1, wherein the sub relay is constituted by a semi-conductor relay.

4. The circuit structure according to claim 2, wherein the sub relay is constituted by a semi-conductor relay.

* * * * *